Oct. 5, 1965 G. FRANCIA 3,209,542
HYDRAULIC BRAKE SYSTEMS FOR MOTOR VEHICLES
Filed Oct. 7, 1963
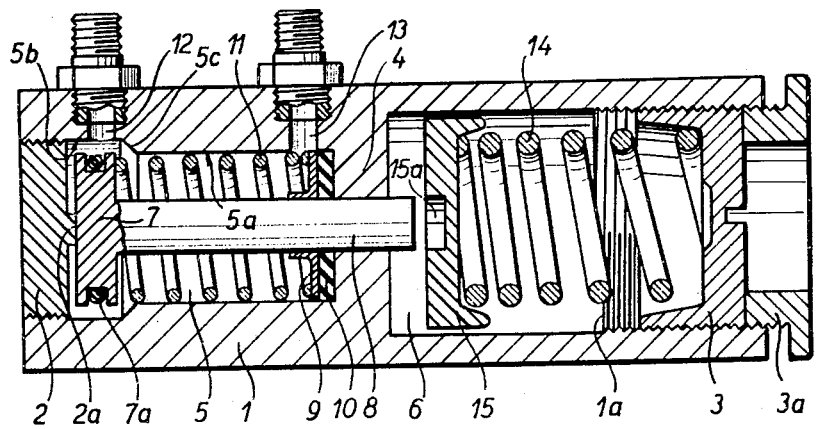

United States Patent Office 3,209,542
Patented Oct. 5, 1965

3,209,542
HYDRAULIC BRAKE SYSTEMS FOR MOTOR VEHICLES
Giovanni Francia, 11–17 Via Vassallo, Genoa, Italy
Filed Oct. 7, 1963. Ser. No. 314,292
Claims priority, application Italy, Oct. 10, 1962,
20,179/62
1 Claim. (Cl. 60—54.5)

This invention relates to a device for use more particularly on vehicles equipped with hydraulic brake systems, adapted to effect variation in braking force ratio between the fore and rear wheels of the vehicle, dependently upon variations in load resulting on the wheels from deceleration and, within certain limits, upon the static load of the vehicle.

Devices adapted to limit and effect gradual variation in braking force on the rear wheels of vehicles provided with hydraulic brake systems are known.

The known devices act to intercept from a predetermined braking pressure onwards communication of the hydraulic circuit associated with the cylinders effecting displacement of the friction members on the rear wheel brakes with the hydraulic pressure generating pump or so-called master cylinder, or to effect a gradual variation, such as a gradual reduction in braking pressure still from a predetermined braking pressure onwards in the said circuit associated with the rear wheel brakes with respect to the pressure acting in the hydraulic circuit connected with the fore wheel brakes and with the master cylinder direct.

The object of such known devices is to suit by a certain extent the braking force on the rear wheels to the process of variation in load distribution on the vehicle among the fore and rear wheels of the vehicle occurring on deceleration of the vehicle.

However, known devices suffer from considerable drawbacks, more particularly their effectiveness is limited to determined loading conditions of the vehicle, still more so to the value of the tire-road friction coefficient.

Consequently, the devices should be so proportioned as to avoid full blocking of the rear vehicle wheels or a condition near to the latter state under a predetermined tire-road friction coefficient and contemplated minimum vehicle load, in order to avoid dangerous skidding of the vehicle on braking.

Obviously, with known devices proportioned as above braking of the vehicle under full load conditions or with a different tire-road friction coefficient is highly ineffective or remote from highest possible efficiency.

This invention provides a device of the type referred to above, simple in construction and of low cost, which can easily be fitted to any type of vehicle equipped with a hydraulic braking system, obviates the abovementioned drawbacks and makes a most efficient braking of the rear wheels possible under any tire-road friction coefficient and, within certain limits, under different vehicle loads without any risk of blocking the rear wheels.

With these objects in view the invention provides a device adapted to be interposed in the conduit connecting the master cylinder with the cylinders effecting displacement of the friction members of the brakes on the rear wheels, which is adapted to shut off the said conduit the moment the braking pressure reaches a predetermined value and initially transmit to the wheel brake cylinders, starting from this moment, a higher pressure than transmitted by the master cylinder, and subsequently effect an automatic variation in the pressure acting on the rear wheel brake cylinders by an extent dependent upon the pressure transmitted by the master cylinder.

According to a preferred embodiment of this invention the device is so constructed than the abovementioned variation in the pressure acting in the rear wheel brake cylinders consists in subtracting from the said pressure a part pressure which is a function of the pressure transmitted by the master cylinder to the device.

A further feature of the invention is that the device is provided with means adapted to determine the characteristics of the abovementioned function which defines the value of the part pressure subtracted from the pressure acting in the part of the hydraulic circuit associated with the rear wheel brake cylinders.

Further characteristic features and advantages of the device according to this invention will be clearly understood from the appended description with reference to the accompanying drawing showing by way of a non-limiting example an embodiment thereof in a longitudinal sectional view.

On the drawing 1 denotes a cylinder closed at one end by a plug 2 and at its other end by a plug 3 of tumbler shape turned with its hollow towards the inside of the cylinder 1. The face of the plug 3 turned towards the outside of the cylinder is formed with a cross slit to assist in screwing it into the bore of the cylinder 1. An auxiliary collet 3a locks the plug 3 in its predetermined position.

An annular diaphragm 4 is arranged within the cylinder 1 and defines in the cylinder two interconnecting chambers 5, 6. The chamber 5 houses a piston 7 formed with a circumferential groove receiving a seal 7a of resilient material, such as rubber, in the form of an O-ring. The piston 7 carries a rod 8 which is slidably mounted near its free end in the central bore in the annular diaphragm 4. A spring 11 is interposed between the piston 7 and a washer 9 bearing on the diaphragm 4 through the interposition of an annular seal 10 of resilient material sealing against the periphery of the rod 8. The spring 11 is adapted to hold the piston 7 adjacent the plug 2 and press it against the projection on the plug 2a when the device is inoperative.

The chamber 5 connects with the outside through two conduits 12, 13, respectively. The conduits 12, 13 are connected to the master cylinder (not shown) and to the hydraulic circuit, respectively, associated with the rear wheel brake cylinders (not shown) operating the friction members, on the vehicle to which the device is fitted.

The chamber 5 is not of constant bore. The chamber comprises a main section connecting with the conduit 13, the cylindrical wall 15a of which substantially matches in bore the outer diameter of the piston 7, and a section 5b adjoining the plug 2 and connecting with the conduit 12, the bore of which is larger than the outer diameter of the piston 7. The two sections of the chamber 5 are interconnected by a section, the wall 5c of which gradually decreases in bore in the direction of the annular diaphragm 4, whereby the walls 5a, 5b merge into each other.

A tough spring 14 is arranged within the chamber 6 which may be connected with the outside, the pitch, hence the stiffness of the spring being variable. One spring end bears on the bottom of the tumbler-shaped plug 3, the other spring end fitting into a cup 15 slidably mounted in the chamber 6, which is formed in its side turned towards the annular diaphragm 4 with a cylindrical seating 15a coaxial with the central bore in the diaphragm 4. The seating is of a suitable diameter to receive the end of the rod 8 on the piston 7.

The length of the spring 14 and/or position of the plug 3 can be selected to cause the cup 15 to directly bear against the annular diaphragm 4. It is then possible by rotating the plug 3 to effect variation in pre-stress of the spring 14. Alternatively, the length of the spring 14 and/or position of the plug 3 can be selected to allow a certain clearance between the cup 15 and diaphragm 4 in the inoperative condition of the device.

The device operates as follows.

On initiation of braking, when the master cylinder starts transmitting to the cylinder 1 a hydraulic pressure, liquid flows through the conduit 12, chamber 5 and conduit 13 towards the rear wheel brake cylinders.

The liquid flow ceases on completion of approach of the brake friction members to their cooperating rotating members fast with the vehicle rear wheels.

On further increment in the hydraulic pressure transmitted to the chamber 5 by the master cylinder, starting from a predetermined pressure value depending upon the cross sectional area of the rod 8 and characteristics of the spring 14, a displacement of the piston 7 and its rod 8 in the direction of the chamber 6 takes place. When the displacement becomes sufficient to cause the piston 7 to reach into the small-diameter section of the chamber 5, the circuit associated with the master cylinder is disconnected from the circuit associated with the rear wheel brake cylinders operating the friction members thereon.

The moment the piston 7 reaches into the small diameter portion of the chamber 5 and intercepts direct intercommunication of the two abovementioned circuits, a pressure increment is built up in the portion of the chamber 5 between the piston 7 and diaphragm 4, hence in the conduit 13 and circuit associated with the latter, the pressure increment depending upon the ratio of the areas of the piston 7 subjected to the action of the pressure transmitted by the master cylinder and to the action of the pressure acting in the circuit of the rear wheel brake cylinders, respectively.

A further increment in the pressure transmitted by the master cylinder results in a protractile stroke of the piston 7 and its rod 8 and, of course, in a further rise in the hydraulic pressure acting in the circuit connected with the conduit 13, together with an increment with respect to the pressure transmitted by the master cylinder depending upon the abovementioned ratio. Such conditions persist till the rod 7 abuts the bottom of the seating 15a in the cup 15, when the spring 14 becomes operative and the pressure transmitted through the conduit 13 to the rear wheel brake cylinders starts sinking below a pressure resulting from the ratio of the areas of the end faces of the piston 7. A part pressure is namely subtracted from the said pressure resulting from the abovementioned ratio, and varies with the increment in the pressure transmitted to the cylinder 1 by the master cylinder in accordance with a law depending upon the characteristics of the spring 14.

It will be understood that the various constructional details of the above described device can be widely varied within the principle of the invention.

For instance, the variable stiffness spring 14 can be replaced by sets of springs in the form of conical discs, the conicity being variable from one disc or disc set to another, or by sets of constant-pitch coiled springs, the coil pitch being variable from one set to another.

In any case it will be clear from the above that the device effects in the circuit associated with the rear wheel brake cylinders at its initial operational stage a pressure increment and at its following operational stage a gradual sinking in the said pressure.

It will be easily understood that the device is capable of automatically suiting the braking force on the rear wheels to the load conditions on the vehicle, inasmuch as the spring characteristics can be designed to take care also and more especially of this performance.

What I claim is:

A hydraulic brake control mechanism adapted to be interposed between a fluid pressure source and a terminal utilization apparatus, comprising a cylindrical chamber having at one end an inlet opening and at the outer end one outlet opening, for connection to said source and said terminal apparatus, respectively, a piston displaceable in said chamber for compressing the fluid in a position thereof, said chamber at said inlet opening having a port of larger diameter than said piston permitting direct fluid connection between said openings when said piston is in its position of rest but closing said communication upon displacement thereof, spring means urging said piston to said position, a rod attached to said piston and extending from said chamber into a housing contiguous therewith, a buffer plate slidable in said housing and positioned to engage said rod beyond a predetermined displacement of said piston, and spring means urging said plate against sliding movement.

References Cited by the Examiner

UNITED STATES PATENTS

| 2,463,173 | 3/49 | Gunderson | 60—54.6 |
| 2,835,271 | 5/58 | Oberthur | 60—54.5 X |
| 3,088,285 | 5/63 | Giacosa et al. | 60—54.6 |

FOREIGN PATENTS

| 57,237 | 10/52 | France. |
| | | (Addition to No. 834,653) |
| 444,955 | 3/36 | Great Britain. |

OTHER REFERENCES

Teves: German printed application No. 1,090,116; Sept. 29, 1960.

SAMUEL LEVINE, *Primary Examiner.*

ROBERT R. BUNEVICH, JULIUS E. WEST,
*Examiners.*